United States Patent

[11] 3,557,890

| [72] | Inventors | Gustaf Lennart Lilljeforss |
| | | Lidingo; |
| | | Oystein Gunnar Skalleberg, Jakobsberg, Sweden |
| [21] | Appl. No. | 12,384 |
| [22] | Filed | Feb. 18, 1970 |
| [45] | Patented | Jan. 26, 1971 |
| [73] | Assignee | AGA Aktiebolag |
| | | Lidingo, Sweden |
| | | a corporation of Sweden |
| [32] | Priority | Mar. 11, 1969 |
| [33] | | Sweden |
| [31] | | 3281/69 |

[54] DEVICE FOR SEQUENTIALLY WEIGHING PREDETERMINED AMOUNTS OF MATERIALS
7 Claims, 2 Drawing Figs.

[52] U.S. Cl. .................................................. 177/1,
177/70, 177/214
[51] Int. Cl. ........................................... G01g 19/24, G01g 1/36
[50] Field of Search ......................................... 177/1, 70, 122, 123, 213—215

[56] References Cited
UNITED STATES PATENTS
| 2,659,563 | 11/1953 | Saxe ............................ | 177/70 |
| 3,117,640 | 1/1964 | McKinney ..................... | 177/70UX |
| 3,123,164 | 3/1964 | Echenique et al. ............ | 177/214X |
| 3,127,947 | 4/1964 | Vogel ........................... | 177/70 |

FOREIGN PATENTS
| 849,314 | 9/1960 | Great Britain ................ | 177/70 |
| 90,085 | 2/1959 | Netherlands ................. | 177/214 |

Primary Examiner—Robert S. Ward, Jr.
Attorney—Larson and Taylor

ABSTRACT: A weighing device for weighing predetermined amounts of materials sequentially introduced into a container which contains residual amounts of the materials. The device includes scale means to set the counterweight on a balance arm such that the arm will balance when the correct amount of a first material is added to the container. The device further includes scale means to add an increment of moment to the balance arm when the arm is in a balanced position after introduction of the correct amount of the first material. The increment of moment added corresponds to the amount of the second material required to be added to the container and this amount is indicated when the arm is rebalanced. The scale means comprise a wheel operable to add moment to the arm in an amount indicated by a scale on the periphery of the wheel. The wheel is movable relative to a fixed scale which indicates the measured residual quantity of the second material in the container. A ring is mounted on said wheel and contains a third scale indicating the correct amount of the second material.

DEVICE FOR SEQUENTIALLY WEIGHING PREDETERMINED AMOUNTS OF MATERIALS

BACKGROUND OF THE INVENTION

The present invention relates to a weighing device. More particularly, the invention relates to balances of the type adapted for the successive weighing of a plurality of substances. Still more particularly, the invention comprises an adjustment device for such a balance and comprising a wheel provided with a measuring scale and with a ring adapted for locking to the wheel and having an additional measuring scale provided thereon. In balances of this type, the wheel is connected with a displaceable counterweight forming part of the balance and which is supported by a lever.

In accordance with a prior proposal, each ring is provided with a stop, which is brought into contact with a disconnectable stop. A balance device of this type as shown in U.S. Application Ser. No. 752,029, filed Aug. 12, 1968 has been found to operate very satisfactorily. However, the disadvantage of such an arrangement of stops is that the adjusting device requires a relatively large space and much handling.

It is an object of the present invention to eliminate the said disadvantage and to provide a simpler adjusting device with improved performance. This and other objects are achieved in accordance with the present invention in a manner which will be self-explanatory to those having ordinary skill in the art, by providing a weighing device for weighing a predetermined quantity of materials added sequentially to an unfilled container comprising, a balance arm, means for supporting said balance arm, means for supporting a container near one end of said balance arm, a weight moveable along said balance arm between a zero point at which said arm is balanced and the other end of said arm, first graduated scale means for moving said weight along said balance arm a predetermined distance to add an amount of moment thereto corresponding to the weight indicated on said scale, second graduated scale means fixed with respect to said balance arm and graduated to indicate relative to its zero point a known residual amount of a material present in the unfilled container, said first scale means being moveable relative to said second scale means and having graduations in a numerical sequence opposite to that of said second scale means whereby movement of said first scale means relative to said second scale means a predetermined distance from its zero point adds a known amount of moment to said balance arm corresponding to said residual amount of said material, third graduated scale means moveable relative to said first scale means and including graduations to indicate the net amount of said material desired in the filled container, means to lock said third scale means and said first scale means together, means for biasing the locked scale means for motion in a direction to add moment to said other end of said balance arm, stop means for preventing motion of said locked scales arm when said second scale is in its zero position, releasable brake means to releasably hold said locked wheels when said second scale is out of its zero position, and means responsive to motion of said balance arm for releasing said brake means upon balancing thereof whereby said locked wheels are moved by said biasing means to add a known moment to the other end of said balance arm. The device is used to sequentially fill a container with quantities of materials in addition to residual quantities thereof which may be present in the container including a known amount of a second material in the container comprising the steps of loading the unfilled container on one end of a balance arm, moving a first scale a first increment relative to its zero point to load the other end of said balance arm with the correct net amount of the first material in the container, moving said first scale a second increment relative to its zero point and relative to a second scale fixed with respect to said balance arm to further load the other end of said balance arm with a weight corresponding to said determined residual quantity of said second material, moving a third scale lockable with said first scale for moving said first scale a third increment to further load the other end of said balance arm with a moment corresponding to the weight of said second material desired to be added to the container, said third scale being moved from a stopped zero position in alignment with the zero positions of said first and second scales to a set position an amount corresponding to the weight of said second material to be added to the container, locking said third scale to said first scale, holding said locked first and third scales in their set positions, filling the container with said first material until said arm balances, moving said locked first and second scales from their set position to add moment to the other end of said balance arm, the amount of said moment being limited by the stopped zero position of said third scale and corresponding to the amount of said second material to be added to the container, and adding said second material to said container until said arm balances.

DETAILED DESCRIPTION

Figure 1:
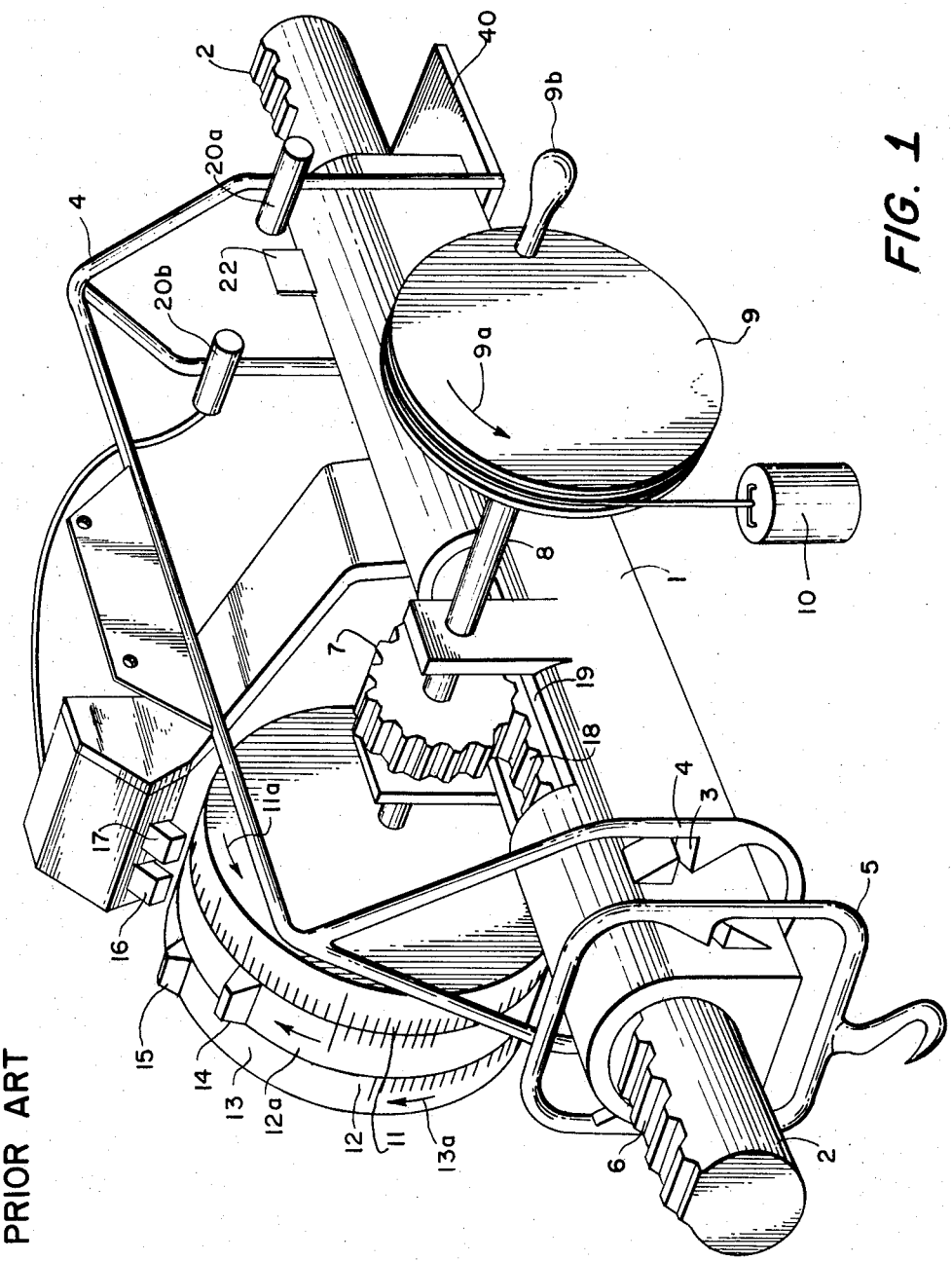
Figure 2:
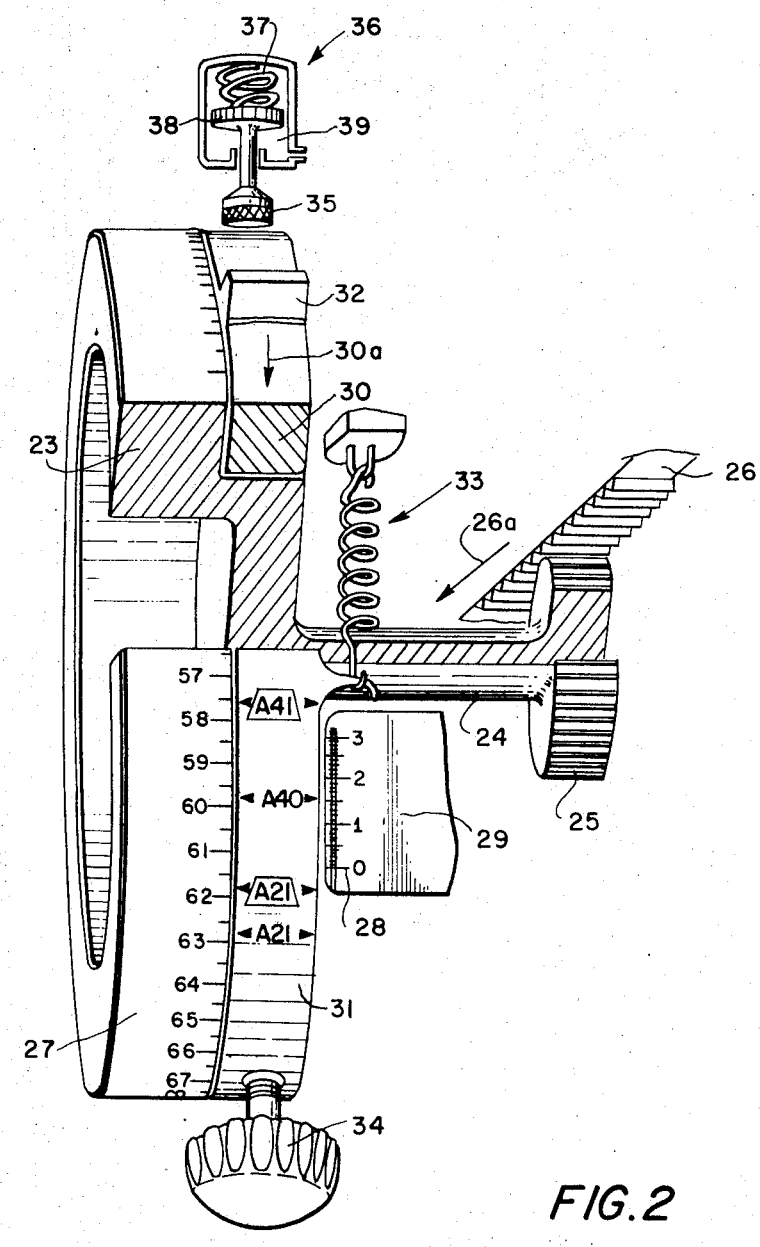

Preferred embodiments of the invention are described in the following description including the drawings in which:

FIG. 1 is a perspective view of a weighing device according to U.S. Application Ser. No. 752,029, filed Aug. 12, 1969; and FIG. 2 is a perspective view of a simplified adjusting device according to the present invention for use in a weighing device of the type shown in FIG. 1

With reference to FIG. 1, the prior weighing device of U.S. Ser. No. 752,029 comprises a balance arm 1 containing a weight 2 movable longitudinally in the arm to make it possible of changing its moment. The arm is balanced at 3 in a housing 4 which is suitably fixed to a supporting member by means not shown. A hook 5 is supported at one end of the housing to carry a container to be filled. The movable weight 2 is provided with a rack 6 moveable by means of a pinion 7 to change the counterweight applied to the other end of the balance arm 1. The pinion 7 is rotatable on shaft 8 which is provided at one end with a pulley 9 and at the other end with a wheel 11. Pulley 9 and wheel 11 are each fixed to the shaft by means not shown for rotation therewith. Pulley 9 is provided with a plummet 10 which biases the wheel for rotation in a direction shown by arrow 9a. The wheel is also provided with a handle 9b for raising the plummet 10.

At a zero position, the arm is balanced. Upon rotation of wheel 11 in the direction shown by arrow 11a, weight 2 is moved in a direction of arrow 21 thus creating an imbalance by adding moment to that end of the arm which is remote from the container supporting means 5. The device is provided with a suitable zero reference point, not shown, at which the scale provided on the periphery of the wheel 11 reads zero and arm 1 is balanced. The scale on wheel 11 is divided into units, conveniently weight units, which measure the amount of weight added to the balance arm upon rotation of wheel 11 a given distance in a direction of arrow 11a relative to the zero point.

The device shown in FIG. 1 is particularly suited to weighing materials sequentially into a container. A typical example, which will be referred to hereinafter, is the weighing of acetylene and acetone into a container. The container is typically a metal shell filled with a porous mass. The acetylene is not stored directly in this tank since it is unstable under pressure. The container is first provided with an appropriate amount of acetone and the acetylene is then introduced into the acetone-containing tank. After use, the tank is returned to the manufacturer for refilling and, at that time, the refilled tank usually contains a residual amount of acetylene and acetone. It is important in filling the tank to include not only the proper amount of acetylene, but also the proper amount of acetone, for reasons which will be self-explanatory. This is accomplished in the device shown in FIG. 1 by wheels 12 and 13 which cooperate with disengageable stops 16 and 17 to add an increment of moment to the balance arm during filling the container in a manner to be described in more detail in connection with a numerical example. In the numerical example, it will be assumed that the weight of the metal tank and porous filling is 50 pounds. The appropriate amount of acetone is 5 pounds. The "tare" weight of the tank is thus 55 pounds and this is marked on the outside of the tank. The proper amount of acetylene to be provided in the filled tank is 10 pounds. Prior to weighing, the acetylene content of the unfilled tank is measured by any convenient means such as by measurement of the tank gas pressure with a manometer. The manometer can conveniently be calibrated to read directly in weight units such as pounds.

In the present example, it will be assumed that the measured quantity of acetylene is 1 pound. The tank is hung on support means 5 and connected to a source of acetone. Wheel 11 is then rotated relative to its zero position to add a counterweight of 55 pounds to balance arm 1. At this point, if the container were filled with acetone until the arm balanced, only a total of 4 pounds of acetone would be present in the container since the unfilled container included 1 pound of acetylene. To compensate for this, wheel 12 is adjusted to provide an additional increment of moment to balance arm 2 to compensate for the residual gas. This is done by rotating wheel 12 from its zero point a distance equivalent to 1 pound in a direction shown by arrow 12a. In the drawing, wheel 12 is shown out of its usual position to clearly show a stop 14. In its zero position, stop 14 is located behind (in the sense of FIG. 1) fixed stop 17 such that wheel 12 is free to rotate only in the direction of arrow 12a. At this point the zero indication on the scale on the surface of wheel 12 corresponds to the zero position on wheel 11. Wheel 12 is freely rotatable with respect to wheel 11. After wheel 12 has been moved a distance equivalent to 1 pound, wheel 12 is locked with respect to wheel 11 and, due to the action of plummet 10, the locked wheels rotate in the direction of arrow 11a until stop 14 engages stop 17. Thus, 1 pound is added to weight 2 making the total counterweight 56 pounds. Acetone is then introduced into the container until the arm balances at which time a correct net amount of 5 pounds of acetone is present in the container. The flow of acetone is then cut off. When arm 1 is balanced, the weighted end rises at which point a plate 22 interrupts a light beam which is directed from source 20a to a photodetector 20b. Photodetector 20b can conveniently be used to terminate the flow of acetone to the container. Deactivation of the photodetector is also utilized to disengage stop 17. Upon disengagement of the stop, wheel 11 rotates in a direction shown by arrow 11a by the action of plummet 10. This adds an additional increment of counterweight to the balance arm 2. This additional increment is adjusted by means of wheel 13 which is set prior to filling the container.

Wheel 13 is freely rotatable with respect to wheels 12 and 11. The wheel is provided with a zero point which is in alignment with the aligned zero point of wheels 11 and 12 when stop 15 is located behind (in the sense of FIG. 1) fixed stop 16. When fixed stop 15 is in engagement with stop 16, wheel 13 is prevented from rotation in a direction other than that of arrow 13a. In the numerical example given, wheel 13 is rotated in the direction of arrow 13a a distance from its zero point equal to the net amount of acetylene to be added to the tank. In this case, the value is 10 pounds and wheel 13 is rotated in the sense of arrow 13a a distance equivalent to 10 pounds. Wheel 13 is then locked to wheel 12 which was previously locked to wheel 11. Thus, the three wheels are rotatable together. As in the case of stop 14, stop 15 is shown out of its normal position in the drawing for illustration. In operation, when stop 14 has been set an increment of 1 pound and is fixed against stop 17, stop 15 will be located a distance behind stop 16 equivalent to 9 pounds. This arises because stop 14 has been rotated an increment of 1 pound with respect to wheel 11 whereas wheel 13 has been rotated an increment equivalent to 10 pounds with respect to wheel 11. Thus, wheel 13 is rotated an increment equivalent to 9 pounds with respect to wheel 12.

Returning to the example, when the flow of acetone is terminated, and stop 17 withdrawn, the locked wheels rotate in the direction of arrow 11a and the rotation is stopped by engagement of stops 15 and 16. As mentioned, the amount of this rotation adds 9 pounds to counterweight 2. At the same time that the flow of acetone is stopped, the flow of acetylene is conveniently started and this flow is continued until the arms balances. At that point, the plate 22 again interrupts the beam of light from light source 20a and the photodetector is then utilized to terminate the flow of acetylene. At that point, the total amount of acetylene in the tank will be 10 pounds.

Wheel 11 may be conveniently provided with a plurality of scales such that each revolution of the wheel adds a certain amount of counterweight to the balance arm. The number of revolutions is conveniently determined by color coding weight 2 at a surface 18 visible through window 19 provided in the balance arm housing. The scales on the wheel 11 are conveniently color coded in the same manner and thus the color of the scale showing in window 19 is read on wheel 11 to determine the weight at which wheel 11 is set.

While the weighing device described above has been operated advantageously to fill acetylene tanks in the manner described, the adjustment of wheels 11, 12 and 13 requires considerable space and handling. According to the present invention, a more simple arrangement for adjusting the weighing device is provided. With reference to FIG. 2, a simplified adjusting device according to the present invention includes a wheel 23 which rotates shaft 24 to cause rotation of pinion 25. Pinion 25 in turn, moves a counterweight 26 in a balance arm of a weighing device such as that shown in FIG. 1. Wheel 23 is provided with a scale 27 located on the periphery thereof. The scale is conveniently divided into units of weight to indicate the amount of weight added upon movement of counterweight 26 in the balance arm, by rotation of wheel 23. The amount of rotation of wheel 23 is measured by the amount that scale 27 is rotated with respect to a zero reference point. At the zero reference point, the arm 26 is in balance and scale 27 indicates zero. A reference point 28 is conveniently provided on a fixed scale 29 to be described hereinafter in more detail. In a numerical example, it will be assumed that the tare weight (including the weight of the container plus acetone) is 59.8 kgs. Wheel 23 is then rotated until 59.8 kgs. on scale 27 is opposite the zero point 28. In this example, it will be assumed that the measured residual quantity of acetylene is 1.5 kgs. Accordingly, wheel 23 is rotated an additional increment of 1.5 kgs. This increment is conveniently read from a second scale 29 which is fixed with respect to the balance arm. Wheel 23 is thus rotated an additional 1.5 kgs. at which point 59.8 on scale 27 is opposite 1.5 on scale 29 as shown in FIG. 2. At this point, if acetone were added to the container until the balance arm balanced, the correct weight of acetone would be added to the container. In order to add an additional increment of weight for the addition of a correct amount of acetylene, ring 30 which is freely rotatable about wheel 23, is rotated in a direction of arrow 30a from its zero position a distance relative to the zero point 28 equivalent to the amount of acetylene desired to be added to the filled container. The amount of acetone desired to be present in the filler container is shown on a scale 31 provided on the periphery of wheel 30 in numerical values or in a simplified code such as that shown. In this case, the total amount of acetone desired in the container is indicated by the tank size which is "A40." When ring 30 is at its zero position, stop 32 is biased by means of a spring 33 against a stop (not shown) which is fixed with respect to the balance arm. Thus, ring 30 is prevented from motion from its zero position in a direction opposite to that of arrow 30a. In its zero position, of course, scale 31 of ring 30 indicates zero acetylene at zero reference point 28. After wheel 23 has been set for the tare and gas residual as mentioned above, ring 30 is rotated against spring 33 as shown until the appropriate amount of acetone to be present in the filled container as indicated on scale 31 registers with the set values of 59.8 on scale 27 and 1.5 on scale 29. Accordingly, wheel 30 has been turned relative to wheel 23 a distance corresponding to the total net amount of acetylene to be included in the tank minus the amount of acetylene measured to be present in the unfilled container. Thus, ring 30 is rotated relative to wheel 23 a distance equal to the amount of acetylene to be added to fill the container with the proper amount of acetylene. When ring 30 is in proper position with respect to wheel 23, it is locked to wheel 23 by means of handle 34. A shoe 35 of a braking device 36 is then moved into engagement with locked wheels by means of a spring 37 which is actuated by a reduction in hydraulic pressure behind piston 38 in chamber 39 of the braking device 36.

Acetone is then introduced to the unfilled container until the balance arm balances. At this point, the flow of acetone is terminated and the total amount of acetone in the container is then correct. The hydraulic pressure in chamber 39 is then increased to disengage the braking device from locked wheels 30 and 23 at which time spring 33 rotates the locked wheels between their set position until stop 32 of ring 30 is engaged with its fixed stop. This causes motion of moment 26 in the balance arm to add the proper increment of weight to the balance arm corresponding to the weight of acetylene to be added. Acetylene is then introduced into the container until the arm rebalances at which time the container is filled with the proper amount of acetylene.

It is preferred that fixed scale 29 is fixed with respect to the balance arm. However, since the scales are conveniently set prior to loading the device, it is sufficient if the scale 29 is fixed with respect to the housing in which the balance arm moves, since it is a simple matter to provide that the balance arm is always in a predetermined position relative to the housing during the adjustment of the scales. For example, the housing may include a platform 40 which limits the downward motion of the housing in the sense of FIG. 1. When wheel 23 is rotated to set the device, the balance arm will rest on platform 40 and thus will always be in a predetermined position relative to the support.

The device according to the present invention can conveniently be operated manually or automatically. In either event, the claimed device includes a means to indicate movement of the balance arm when the counterweight is balanced by the load. Detection of this motion can take the form of a simple observation made by the operator or any suitable automatic means such as a light and photodetector means as shown in FIG. 1. Upon detection of the motion of the balance arm, the flow of the material being introduced to the container is terminated and this can be done manually or automatically by conventional means such as by a solenoid-operated valve. Motion of the balance arm also serves to disengage the brake means to permit motion of the locked wheels. This can also be done automatically for example by valving high-pressure fluid into chamber 39 to withdraw brakeshoe 34 from the locked wheel. Alternatively, of course, the braking means can be disengaged from the locked wheels manually. After the locked wheels are permitted to rotate to add a further increment of weight to the balance arm corresponding to the weight of acetylene gas to be added, the flow of acetylene gas is initiated and this, of course, can be done manually or automatically by conventional means. When the arm rebalances, the flow of acetylene is again stopped and this is again easily done automatically or manually.

From the foregoing, it will be readily appreciated that the adjustment device of the earlier weighing device has been greatly simplified to facilitate adjustment prior to weighing operations. In all other respects, however, the device is as useful as the prior art weighing device and obtains all the advantages thereof. For example, the device can be readily made automatic.

We claim:

1. A weighing device for weighing a predetermined quantity of materials added sequentially to an unfilled container comprising: a balance arm; means for supporting said balance arm; means for supporting a container near one end of said balance arm; a weight moveable along said balance arm between a zero point at which said arm is balanced and the other end of said arm; first graduated scale means for moving said weight along said balance arm a predetermined distance to add an amount of moment thereto corresponding to the weight indicated on said scale; second graduated scale means fixed with respect to said balance arm and graduated to indicate relative to its zero point a known residual amount of a material present in the unfilled container, said first scale means being moveable relative to said second scale means and having graduations in a numerical sequence opposite to that of said second scale means whereby movement of said first scale means relative to said second scale means a predetermined distance from its zero point adds a known amount of moment to said balance arm corresponding to said residual amount of said material; third graduated scale means moveable relative to said first scale means and including graduations to indicate the net amount of said material desired in the filled container; means to lock said third scale means and said first scale means together; means for biasing the locked scale means for motion in a direction to add moment to said other end of said balance arm; stop means for preventing motion of said locked scales when said second scale is in its zero position; releasable brake means to releasably hold said locked wheels when said second scale is out of its zero position; and means responsive to motion of said balance arm for releasing said brake means upon balancing thereof whereby said locked wheels are moved by said biasing means to add a known moment to the other end of said balance arm.

2. A weighing device according to claim 1 wherein: said first graduated scale means comprises a wheel mounted for rotation with a shaft rotatably mounted in said housing to move said weight, the outer cylindrical surface of said wheel being provided with a scale graduated to indicate the correct total weight of a first material desired in the filled container; and wherein third scale comprises a ring rotatable about the periphery of said wheel, the outer cylindrical surface of said ring being adjacent the outer cylindrical surface of said first wheel and provided with a scale graduated to indicate the net weight of the second material desired in the filled container.

3. A weighing device according to claim 2 wherein said movable weight includes a rack which cooperates with a pinion mounted for rotation on said shaft.

4. A weighing device according to claim 2 wherein said biasing means comprises spring means.

5. A weighing device according to claim 2 wherein said stop means comprises an arm protruding from said ring and engageable with a stop surface fixed with respect to said balance arm.

6. A method of sequentially filling a container with predetermined quantities of materials, said container having residual quantities of said materials therein including a known amount of a second material comprising the steps of: loading the unfilled container on one end of a balance arm; moving a first scale a first increment relative to its zero point to load the other end of said balance arm with the correct tare weight of the container including the desired net amount of the first material in the container; moving said first scale a second increment relative to its zero point and relative to a second scale fixed with respect to said balance arm to further load the other end of said balance arm with a moment corresponding to said determined residual quantity of said second material; moving a third scale, lockable with said first scale for moving said first scale a third increment to further load the other end of said balance arm with a moment corresponding to the weight of said second material desired to be added to the container, said third scale being moved from a stopped zero position in alignment with the zero positions of said first and second scales to a set position an amount corresponding to the weight of said second material to be added to the container; locking said third scale to said first scale; holding said locked first and third scales in their set positions; filling the container with said first material until said arm balances; moving said locked first and second scales from their set position to add moment to the other end of said balance arm, the amount of said moment being limited by the stopped zero position of said third scale and corresponding to the amount of said second material to be added to the container; and adding said second material to said container until said arm balances.

7. A method according to claim 1 wherein said container is a metal tank containing a porous filler material, said first material comprises acetone, and said second material comprises acetylene.